Patented Nov. 14, 1933

1,935,188

UNITED STATES PATENT OFFICE 1,935,188

METHOD OF PREPARING CATALYTIC GELS

Max Latshaw and William Lee Judefind, Berkeley, Calif., assignors to The Silica Gel Corporation, Baltimore, Md., a corporation of Maryland No Drawing. Application October 31, 1929, Serial No. 403,900, and in France March 1, 1928

24 Claims. (Cl. 23—233)

The present application which is a continuation in part of application Serial No. 172,552, filed March 3, 1927, relates to processes of preparing catalytic gels comprising metals associated with gel substances such as silica gel. More particularly it has to do with processes of preparing catalytic gels in which the catalytically acting metal or compound of such metal is precipitated upon and in the pores of the gel substance.

United States Patent No. 1,547,236, granted July 28, 1925, describes a process of preparing catalytic gels wherein the catalytically acting metal is precipitated upon and in the pores of the gel. The steps of the process disclosed in this patent are as follows:

1. The silica gel is subjected simultaneously to the action of a vacuum pump and heat, by which means the adsorbed gases of all kinds are practically removed therefrom.

2. While retaining the gel under a vacuum, and exercising the necessary precautions against the admission of air or other gases to the gel, the gel is cooled to or below room temperature.

3. When the temperature of the gel has been brought down to about room temperature hydrogen gas is admitted so as to fill the vacuum, and allowed to remain in contact with the silica gel for a suitable period of time.

4. After the silica gel has adsorbed the maximum amount of hydrogen gas, a solution of a particular metal salt such as copper sulphate, copper nitrate, silver nitrate or platinum chloride, is admitted to the hydrogen filled container with the silica gel therein. The mixture is then agitated.

5. The silica gel and the solution are allowed to remain in contact for a sufficient length of time to complete the reaction, which immediately begins to take place. This reaction consists in the reduction of the metallic ion of the salt in the solution to the metallic state by the adsorbed hydrogen.

Gel substances such as silica gel are hard, highly porous, heat stable products, the pores being ultramicroscopic. They are most commonly prepared by reacting solutions of a soluble silicate and an acid, such as hydrochloric or sulphuric acids, the proportions and concentrations of the acid and silicate solutions employed being such that a clear liquid results. The viscosity of this liquid gradually increases and after a few hours hardens or coagulates to a hydrogel. This hydrogel is then broken into pieces, washed and dried in a particular manner. The resulting product is the porous, highly adsorbent, silica gel.

In the commercial manufacture of silica gel usually sulphuric acid is employed. Silica gel made from ingredients which include sulphuric acid can not be impregnated to any substantial extent with a metal by the process of this Patent, No. 1,547,236, if hydrogen is employed as the reducing or reacting gas.

According to the present invention it has been found that reacting gases having more than one kind of atom in the molecule are sufficiently active as agents for depositing or precipitating the metallic component of the salt compound either as the metal or a compound thereof, throughout, in, and upon, the pores and surfaces of the particles of silica gel of any kind, no matter what acid may have been used in the process of making the gel. Reacting gases of this nature which may be used are hydrogen sulphide, carbon monoxide, sulphur dioxide, arsine, phosphine, stibine, water gas, ethylene, acetylene, and carbon dioxide.

According to the present invention, silica gel prepared in any manner so as to give a highly porous product, is partially freed of adsorbed gases, for example, air, by subjecting it to a heat and vacuum treatment or a vacuum treatment. The heat and vacuum treatment is effected by placing the gel in a container provided with a jacket for circulating a fluid therethrough, and evacuating the gel while circulating a heated fluid through the jacket so as to heat the container and gel therein, preferably to a temperature of about 200° C. In the case of the vacuum treatment alone, the gel may be evacuated by placing it in a container, and evacuating the container by means of a vacuum pump. The evacuation treatment with or without heat is continued until the total pressure therein is somewhat less than an atmosphere, say about $\frac{1}{10}$ of an atmosphere. This partial evacuation of the container leaves about 90% of the original quantity of air within the gel. This air acts as a non-reactive diluent for the reacting gas with which the gel is subsequently treated.

By evacuating the gel only partially, it is possible to prevent too great an excess of reacting gas from being adsorbed in the gel. If too great an amount of the reacting gas is adsorbed in the gel, it is evolved in such quantity in the space above the gel that when the impregnating solution comes in contact with it much of the metallic component is precipitated in the descending solution before the solution comes in contact with the gel, thereby preventing the deposition of the metal in a highly dispersed state in and about the pores of the gel.

It is also possible to prevent too great an excess of the reacting gas being adsorbed in the gel, by passing the reacting gas diluted with a certain percentage, say 80% to 90%, of a non-reactive diluent, such as air, through a mass of gel which has been completely evacuated or not evacuated at all.

A reacting gas such as arsine, phosphine, stibine, water gas, ethylene, acetylene, carbon dioxide, carbon monoxide, sulphur dioxide, or hydrogen sulphide, preferably hydrogen sulphide, either pure or diluted with a certain percentage of a non-reactive gas, may be passed through a mass of evacuated or non-evacuated gel. It is preferred to have the gel hot, say of a temperature of 100° to 120° C. when the reacting gas is caused to pass therethrough. By effecting the adsorption of the reacting gas while the gel, the gas, or both, are at an elevated temperature the amount of gas adsorbed in the gel is decreased. If it is desired to adsorb an amount of reacting gas greater than can be adsorbed at normal or elevated temperature, then the gel, the gas, or both are cooled to a temperature substantially below room temperature, say 5° to 10° C., and the gas then passed through the gel.

The reacting gas adsorbed in the gel substance should be in excess of the calculated amount necessary to react with the metallic component of the salt to cause the precipitation or deposition of said component either as the metal or a compound thereof in and about the pores of the gel. The amount of gas adsorbed should be in excess of the stoichiometric amount by 20% to 100%. As previously stated, if too great an excess of reacting gas is adsorbed in the gel, the gas is evolved in such quantity in the space above the gel that when the solution containing the catalytically acting metal comes in contact therewith much of the metallic component is precipitated in the descending solution before the solution comes in contact with the gel, with the result that the deposition of the metal does not take place within and about the pores of the gel. By using a quantity of reacting gas such as not to be too great in excess of the calculated amount, this action is prevented, and the precipitation of the catalytically acting metal takes place in and about the pores of the gel in a highly dispersed state.

After the gel substance, such as silica gel, has been charged with the requisite amount of the reacting gas, a solution of a salt of a catalytically acting metal is brought in contact with the gel. For example, a solution of platinic chloride or of silver nitrate may be used or solutions of salts of any other metals which are capable of being used as catalysts. The solution of the salt of the catalytic metal should be preferably a dilute solution, for example, of a concentration of 0.3% to 3.0% by weight. While dilute solutions are preferred, it is to be understood that solutions of greater degree of concentration may also be employed.

The quantity of the solution containing the catalytic metal which is brought into contact with the gel should be such as to be just sufficient to fill the pores of the gel, generally about 35% to 40% of the weight of the gel. By contacting the gel containing the adsorbed reacting gas with the solution of the catalytic metal in the amount required to fill the pores of the gel, the catalytic metal is deposited either as the metal or a compound thereof in and about the pores of the gel in the prescribed amount.

When the solution of the catalytic metal salt is brought into contact with the gel charged with a reacting gas, usually some decrepitation of the gel particles occurs. This may be materially decreased by bringing the solution into contact with the gel particles in such manner that no substantial excess of liquid over that required to fill the pores of the gel is present during this treatment, for instance, by spraying the solution over the gel while the gel particles are being agitated. After this treatment with the solution the gel particles are practically dry to the touch.

As the particles of gel are sensibly dry, no draining or washing thereof is necessary. However, they contain considerable moisture, retained within the pores. This is reduced, by heating the gel particles, after impregnation, at a temperature of about 105° C. for about 8 hours.

Decrepitation of the gel particles when treated with the solution containing the catalytic metal may be greatly reduced by employing a gel which has been dried so that the water content is less than 5% of the dry weight of the gel.

Following are specific examples of the present process.

*Example 1*

Step 1. 500 grams of activated granular silica gel made with sulphuric acid is subjected to the heat and vacuum treatment to free the gel of adsorbed gases, such as air. This is accomplished by placing the gel in a container provided with a jacket for the circulation of a fluid therethrough. The container is then evacuated, as by means of a vacuum pump, heat being supplied to the container by the circulation of a heated fluid through the jacket of the container. The evacuation of the container is continued until the total pressure therein is about 10 millimeters of mercury.

Step 2. After cooling to 32° C., the vacuum being retained, carbon monoxide is introduced into the container until the pressure therein is atmospheric. At this point the container is filled with carbon monoxide and a trace of air, 60 grams of gel adsorbing about 160 cubic centimeters of carbon monoxide at 90° F. and a pressure of 760 mm. mercury.

Step 3. About 190 cubic centimeters of a platinum chloride solution containing 0.375 grams of platinum is mixed with the gel, the gel and solution being agitated during the mixing. Upon contact of the solution with the gel, the gel turns at first brown and then black, and platinum is deposited in and about the pores of the gel. Within a few minutes, say about 15 minutes, the reaction is complete, and the gel particles are practically dry to the touch.

Step 4. Although the gel particles are sensibly dry, they still contain moisture which is held within their pores. In order to reduce and practically free the gel particles of this moisture, they are heated in a current of air at a temperature of 105° C. for about 8 hours.

*Example 2*

Step 1. 500 grams of activated granular silica gel is subjected to a vacuum treatment. This is accomplished by placing the gel in a suitable container, and evacuating the container, as by means of a vacuum pump. The evacuation is stopped when the total pressure therein is about 1/10 of an atmosphere.

Step 2. Undiluted hydrogen sulphide is introduced into the container until the total pressure therein is atmospheric. This gives a gas mixture of 90% air and 10% hydrogen sulphide.

Step 3. About 190 cubic centimeters of a platinum chloride solution containing 0.375 grams of platinum is mixed with the gel, the gel and solution being agitated during the mixing. Upon contact of the solution with the gel, the gel turns black almost instantly, and platinum sulphide is precipitated in and about the pores of the gel. Within a few minutes, say about 10 minutes, the reaction is complete, and the gel particles are practically dry to the touch.

Step 4. Although the gel particles are sensibly dry, they still contain moisture which is held within their pores. In order to reduce and practically free the gel particles of this moisture, they are heated in a current of air at a temperature of 105° C. for about 8 hours.

Step 5. The platinum sulphide deposited in and about the pores of the gel is converted into metallic platinum by heating the gel in a stream of air at 500° C. for about 4 hours.

*Example 3*

Step 1. 500 grams of activated granular silica gel is placed in a container provided with a jacket for the circulation of a heated fluid therethrough. A fluid heated to a temperature such as to heat the container to about 120° C. is caused to circulate through said jacket.

Step 2. While the gel is of a temperature of 120° C., undiluted hydrogen sulphide is passed through the gel in the container. The flow of gas is stopped when the gel has been saturated with hydrogen sulphide.

The gel saturated with hydrogen sulphide is then treated according to steps 3, 4 and 5 of Example 2.

*Example 4*

Step 1. 500 grams of granular silica gel of a water content of less than 5% of its dry weight is placed in a container and evacuated, as by means of a vacuum pump. The evacuation is stopped when the total pressure therein is about 1/10 of an atmosphere.

Step 2. Undiluted hydrogen sulphide gas is then passed into the container until the total pressure therein is atmospheric. This gives a gas mixture of 90% air and 10% hydrogen sulphide.

The gel is then treated according to steps 3, 4 and 5 of Example 2.

*Example 5*

Step 1. 500 grams of granular silica gel having a water content of less than 5% of its dry weight is introduced, at room temperature or lower, say about 5° C. into a 5 liter balloon flask containing a mixture of 50% arsine and 50% air. The flask is rotated for about 2 minutes to allow the arsine to be adsorbed within the pores of the gel.

Step 2. About 190 cc. of a chlorplatinic acid solution containing 0.375 grams of platinum is poured on to the gel in the flask. While the chlorplatinic acid solution is being poured into the flask, the flask is continuously rotated so as to agitate the gel particles. Upon contact of the solution with the gel, the gel turns black almost instantly and after about 3 minutes the reaction is complete. The gel particles are uniformly black and dry to the touch.

The gel particles are then treated according to steps 4 and 5 of Example 2.

It is to be understood that the invention is not limited to the metal platinum or compounds thereof, as other metals such as silver, nickel, copper, palladium, iron or any other metal which can be reduced or precipitated by the gas when adsorbed in the gel into the metal or compounds thereof, may be employed.

Although the invention has been described in connection with impregnating silica gel, it will be understood that it is applicable to other gels, for example, gels of stannic oxide, tungstic oxide, aluminum oxide, etc.

Having thus described the invention, what is claimed as new and desired to be secured by Letters Patent is:

1. In the method of preparing an impregnated gel, the steps of adsorbing a reacting gas having more than one kind of atom in the molecule in a highly adsorbent gel, and contacting the thus treated gel with a solution of a compound of a catalytic metal capable of being converted by said gas into a catalytically active substance.

2. The method according to claim 1 wherein the reacting gas is hydrogen sulphide.

3. The method according to claim 1 wherein the catalytic metal is platinum.

4. In the method of preparing an impregnated gel, the steps of adsorbing a reacting gas having more than one kind of atom in the molecule in a highly adsorbent gel having a moisture content of less than 5% of its dry weight, and contacting the thus treated gel with a solution of a compound of a catalytic metal capable of being converted by said gas into a catalytically active substance.

5. The method according to claim 4 wherein the reacting gas is hydrogen sulphide.

6. In the method of preparing an impregnated gel, the steps of adsorbing a reacting gas having more than one kind of atom in the molecule to be adsorbed in the gel while in a heated condition, and contacting the gas treated gel with a solution of a compound of a catalytic metal capable of being converted by said gas into a catalytically active substance.

7. In the method of preparing an impregnated gel, the steps of causing a reacting gas having more than one kind of atom in the molecule and containing a nonreactive diluent to be adsorbed in the gel, and contacting the thus treated gel with a solution of a compound of a catalytic metal capable of being converted by said gas into a catalytically active substance.

8. In the method of preparing an impregnated gel, the steps of freeing a highly adsorbent gel of adsorbed gases, causing a reacting gas having more than one kind of atom in the molecule to be adsorbed in the gel, and contacting the thus treated gel with a solution of a compound of a catalytic metal capable of being converted by said gas into a catalytically active substance.

9. In the method of preparing an impregnated gel, the steps of freeing a highly adsorbent gel having a moisture content of less than 5% of its dry weight of adsorbed gases, causing a reacting gas having more than one kind of atom in the molecule to be adsorbed in the gel, and contacting the thus treated gel with a solution of a compound of a catalytic metal capable of being converted by said gas into a catalytically 10. The method according to claim 9 wherein the reacting gas is hydrogen sulphide.

11. The method according to claim 9 wherein the catalytic metal is platinum.

12. In the method of preparing an impregnated gel, the steps of freeing a highly adsorbent gel of adsorbed gases, causing a reacting gas having more than one kind of atom in the molecule and containing a nonreactive diluent to be adsorbed in the gel, and contacting the thus treated gel with a solution of a compound of a catalytic metal capable of being converted by said gas into a catalytically active substance.

13. The method according to claim 12 wherein the reacting gas is hydrogen sulphide.

14. In the method of preparing an impregnated gel, the steps of partially freeing a highly adsorbent gel of adsorbed gases, causing a reacting gas having more than one kind of atom in the molecule to be adsorbed in the gel, and contacting the thus treated gel with a solution of a compound of a catalytic metal capable of being converted by said gas into a catalytically active substance.

15. In the method of preparing an impregnated gel, the steps of evacuating a highly adsorbent gel so as to free it of adsorbed gases, causing a reacting gas having more than one kind of atom in the molecule to be adsorbed in the evacuated gel while in a heated condition, and contacting the gas treated gel with a solution of a compound of a catalytic metal capable of being converted by said gas into a catalytically active substance.

16. The method according to claim 15 wherein the reacting gas is hydrogen sulphide.

17. In the method of preparing an impregnated gel, the steps of saturating a highly adsorbent gel with a reacting gas having more than one kind of atom in the molecule, and treating the gas saturated gel with a solution of a compound of a catalytic metal capable of being converted by said gas into a catalytically active substance in an amount sufficient to react with said gas and leave the gel practically dry to the touch.

18. In the method of preparing an impregnated gel, the steps of saturating a highly adsorbent gel with a reacting gas having more than one kind of atom in the molecule, treating the gas saturated gel with a solution of a compound of a catalytic metal capable of being converted by said gas into a catalytically active substance in an amount sufficient to react with said gas and leave the gel practically dry to the touch, and removing the moisture contained within the pores thereof.

19. The method according to claim 18 wherein the reacting gas is hydrogen sulphide.

20. The method according to claim 18 wherein the catalytic metal is platinum.

21. In the method of preparing an impregnated gel the steps of saturating a highly adsorbent gel of a moisture content of less than 5% of its dry weight with a reacting gas having more than one kind of atom in the molecule, and treating the gas treated gel with a solution of a compound of a catalytic metal capable of being converted by said gas into a catalytically active substance in an amount sufficient to react with said gas and to leave the gel sensibly dry.

22. In the method of preparing an impregnated gel, the steps of saturating an activated, highly adsorbent gel of the type made from ingredients including sulphuric acid with a reacting gas having more than one kind of atom in the molecule which is capable when in the gel of depositing in and on the gel the metallic component of a solution of a compound of a metal, and treating the saturated gel with such a solution.

23. The method according to claim 22 wherein the gas is hydrogen sulphide.

24. The method according to claim 22 wherein the metal is platinum.

MAX LATSHAW.
WILLIAM LEE JUDEFIND.